United States Patent [19]

Nakajima et al.

[11] 3,918,723

[45] Nov. 11, 1975

[54] CANTILEVER FOR USE WITH PICKUP CARTRIDGE

[75] Inventors: Heitaro Nakajima; Hirotake Kawakami, both of Tokyo; Shiyokichi Tatara, Yokohama, all of Japan

[73] Assignee: Sony Corporation, Tokyo, Japan

[22] Filed: July 3, 1974

[21] Appl. No.: 485,375

[30] Foreign Application Priority Data

July 9, 1973 Japan ............................... 48-81383

July 9, 1973 Japan ............................... 48-81384

[52] U.S. Cl. ....................................... 274/37; 274/37

[51] Int. Cl.² ........................................... G11B 3/02

[58] Field of Search ................ 274/37, 23 R; 264/29

[56] References Cited

UNITED STATES PATENTS

| | | | |
|---|---|---|---|
| 1,013,421 | 1/1912 | Millet | 274/37 |
| 1,321,178 | 11/1919 | Wolff | 274/23 R |
| 2,509,356 | 5/1950 | Kilgour | 274/37 |
| 3,760,125 | 9/1973 | Laue | 274/37 |
| 3,818,082 | 6/1974 | Burns et al. | 264/29 |

*Primary Examiner*—Richard E. Aegerter

*Assistant Examiner*—Charles E. Phillips

*Attorney, Agent, or Firm*—Hill, Gross, Simpson, Van Santen, Steadman, Chiara & Simpson

[57] ABSTRACT

A cantilever for use in supporting the stylus of a magnetic phonograph pickup cartridge, the cantilever including a bar-shaped body composed at least in part of carbonaceous fibers in a binder matrix of a thermosetting resin. A method of manufacturing the cantilever structure is also disclosed.

10 Claims, 7 Drawing Figures

CANTILEVER FOR USE WITH PICKUP CARTRIDGE

BACKGROUND OF THE INVENTION

1. Field of the Invention

This invention is in the field of cantilever structures for supporting a stylus in a pickup cartridge, and is specifically concerned with an improved light-weight, high-strength, cantilever.

2. Description of the Prior Art

A cantilever structure for use with a magnetic pickup cartridge should have a sufficiently high rigidity and should not interfere with securing a broad band frequency response, particularly in the high frequency end. In addition, the cantilever should have an equivalent mass, as seen from a stylus fitted to one end thereof, as small as possible, and hence should be made of a material having a low specific gravity. Moreover, the cantilever must be uniform in characteristics and should be capable of being manufactured in a simple manner.

Prior art has made use of drawn aluminum in the form of integral, hollow cylindrical bodies as cantilever structures for stylus assemblies. Aluminum, however, has a relatively low modulus of longitudinal elasticity E on the order of 7,000 kilograms per square millimeter and a relatively large specific gravity of the order of 2.7. As a result, cartridges which make use of aluminum cantilivers have the disadvantage that the reproduction frequency characteristics are not flat, that is, there is a decrease of output from the intermediate frequency range to the high frequency range, thereby causing a deterioration in sound quality, and limiting the upper frequencies which can be reproduced. In order to improve the high frequency response, the equivalent mass of the cantilever must be made very small. In order to accomplish this, an aluminum cantilever is made hollow, and the thickness of the cantilever is made as small as possible. This type of cantilever, however, results in a decrease in its rigidity with a resultant decrease in the frequency repsonse characteristics of the unit.

SUMMARY OF THE INVENTION

The cantilever assembly according to the present invention includes oriented carbonaceous fibers. By "carbonaceous fibers", we refer to the high modulus, high strength, low density fibers composed of carbon or graphite, which are commercially available materials in the form of parallel strands of the fibers in a ribbon or ply of thermosettable resin material.

The cantilever of the present invention is characterized by a small mass for a given rigidty. The cantilever of the present invention has a small equivalent mass and therefore contributes to a higher frequency response. When the cantilever assembly of the present invention is used with a pickup cartridge, the reproduction of the invention is used with a pickup cartridge, the reproduction of the intermediate frequency range and the high frequency range are made substantially uniform.

In a preferred embodiment of the present invention, the cantilever for the present invention consists of several plies of carbonaceous fibers which are superimposed on each other, the fibers in one ply being oriented along a major axis of the bar-shaped body, and the fibers in the other ply being oriented at an angle to said major axis. The cantilever assembly of the present invention is also provided with a bent portion at one end inclined from the center axis of the body and arranged to receive a stylus. The bar-shaped body may be tapered with a reducing cross-sectional area terminating at this bent portion.

The method involved for manufacturing the cantilever of the present invention involves providing plies of resin impregnated carbonaceous fibers, positioning the plies in superimposed relationship in a mold, applying heat and pressure to the superimposed plies in the mold, and removing the rigidified cantilever from the mold.

DESCRIPTION OF THE PREFERRED EMBODIMENTS

Figures 1, 2:
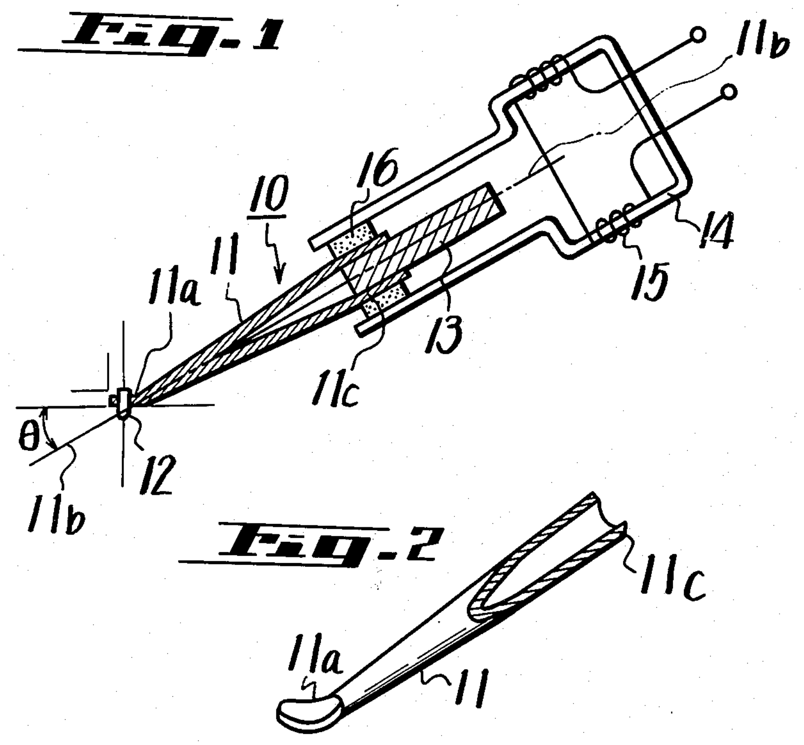
FIG. 1 is a somewhat diagrammatic representation of a moving magnet type cartridge assembly provided with a cantilever according to the present invention.
FIG. 2 is an enlarged view in perspective of the cantilever produced according to the present invention, partly in cross section.

In FIG. 1, reference numeral 10 refers generally to a cartridge of the moving magnet type used as a phonograph pickup. Reference numeral 11 has been applied to a bar-shaped cantilever according to the present invention which is composed of carbonaceous fibers rigidified in a binder matrix of a thermosetting resin such as a phenolic, a polyester, or an epoxy resin. The cantilever 11 has a tapered shape having a decreasing cross section which terminates in an angularly offset end portion 11*a*, through which a stylus 12 is arranged to be received.

The carbonaceous fibers may be impreganted with a thermosetting resin to the extent of about 30 to 40% by weight of the carbonaceous fibers, and the fiber bundle thus impregnated may be heated under pressure and molded into a predetermined shape, as will be apparent from a succeeding portion of this description.

The cantilever 11 is provided at its opposite end with a transducer including a magnet 13. The pole piece 14 has a coil 15 wound therearound. The cantilever 11 supports the pole piece 14 with the aid of a damper 16 so that it is confined between the pole piece 14 and the magnet 13.

The offset end 11*a* of the cantilever is inclined from an axis 11*b* of the cantilever 11 by an angle $\theta$, which is referred to as the vertical angle. The large diameter end 11c opposite to the tapered free end 11*a* is made hollow, as shown in FIG. 2.

The carbonaceous fiber mass rigidified with the thermosetting resin has a modulus of longitiudinal elasticity E on the order of 14,000 kilograms per square millimeter, which is two times larger than that of aluminum, and has a specific gravity on the order of 1.2, which is less than half that of aluminum. As a result, a cantilever produced according to the present invention having a cross sectional area substantially the same as that of a prior art cantilever composed of an aluminum tube provides a rigidity which is considerably higher than that of the prior art device and obtains an equivalent mass which is significantly smaller than the aluminum tube type cantilever.

Figure 3:
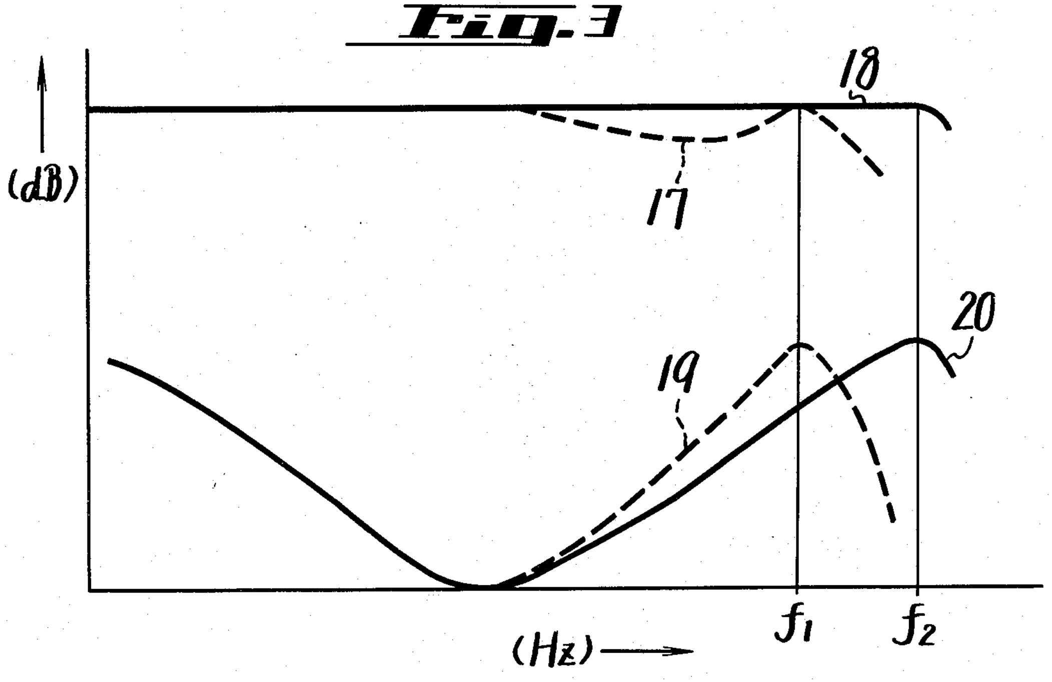
FIG. 3 is a graph comparing a frequency response characteristic of the cantilever of the present invention, and the prior art cantilever.

The pickup cartridge using the cantilever of the present invention is capable of providing total frequency response characteristics. A cartridge which uses the prior art type cantilever composed of an aluminum tube is subjected to a so-called sagging phenomenon in which the output becomes reduced from the intermediate sound frequency and going to the high frequency range as shown by dotted line, curve 17 in FIG. 3, and the upper frequency limit is indicated at approximately $f_1$. On the contrary, a cartridge making use of the cantilever according to the present invention has a high rigidity so that there is no sagging phenomenon, as shown by the full line, curve 18. The small equivalent mass possessed by the cantilever extends the upper frequency range to a frequency $f_2$. In addition, a pickup cartridge employing a conventional prior art cantilever has a frequency response which is characterized by a separation shown by a broken line curve 19 in FIG. 3, whereas the pickup cartridge making use of the cantilever of the present invention improves the separation characteristics as shown by the full line curve 20 in FIG. 3.

Figure 4:
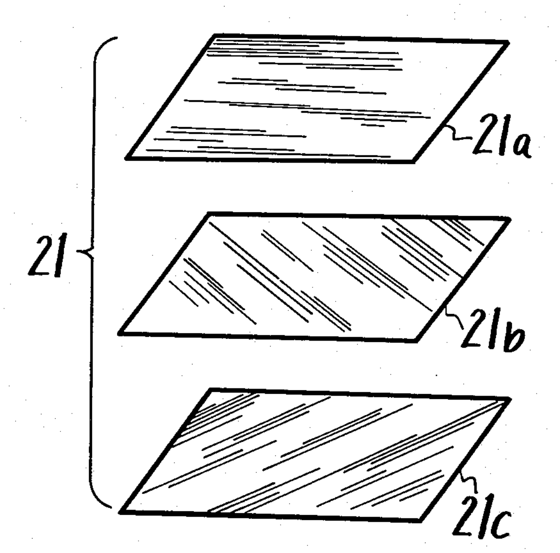
FIG. 4 is a view showing three sheets of resin impregnated carbon fibers which may be used in accordance with the present invention.

A suitable method for manufacturing the cantilever 11 shown in FIGS. 1 and 2 to provide the tapered free end 11*a* inclined from the axis 11*b* by the vertical angle $\theta$ will now be described. As shown in FIG. 4, a plurality of sheets 21 containing aligned carbonaceous fibers and each impregnated with an epoxy resin are first provided. The fibers in one of the sheets, such as 21*a*, are oriented so that they are in line with the major axis of the cantilever to be produced. The fiber orientation in sheets 21*b* and 21*c*, however, are different from the fiber orientation in sheet 21*a*, as shown in FIG. 4 so that when the sheets are superimposed on each other, a composite sheet is obtained which has a high rigidity and a high resistance against shear. In the embodiment shown in FIG. 4, use has been made of three sheets, but in practice more than three sheets may be superimposed on one another to obtain a composite laminated sheet.

Figure 5:
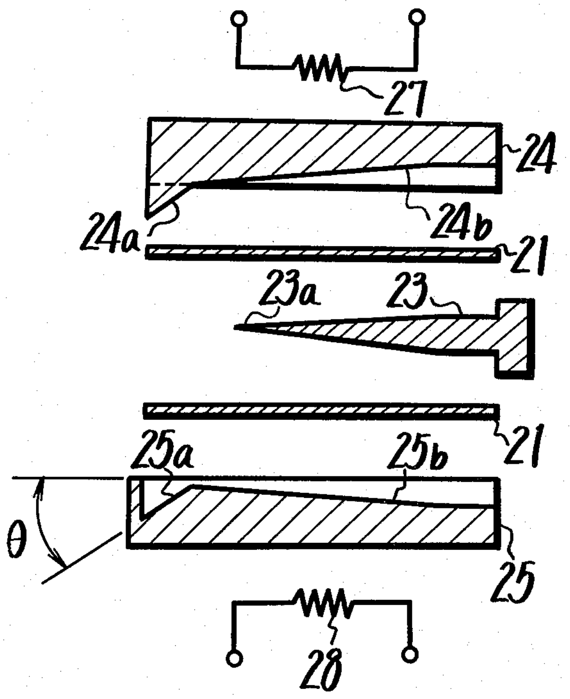
FIG. 5 is a diagrammatic showing, partly in cross section, illustrating an apparatus for manufacturing a cantilever of the type shown in FIG. 1.

As shown in FIG. 5, a composite sheet 21 thus obtained is combined with a core 23 positioned between upper and lower mold members 24 and 25, respectively. The sheet 21 may surround the core 23 or separate sheets 21, 21 may be employed with one of the sheets being positioned between the upper metal mold 24 and the core 23, while the other sheet may be positioned between the lower metal mold 25 and the core 23. The core 23 is provided with a tapered front end 23*a* whose contour corresponds with the inner contour of the hollow portion of the cantilevers shown in FIG. 1. The metal mold 25 is provided at its upper surface with a tapered depression 25*a* whose surface is inclined from the upper surface by the angle $\theta$ for the purpose of forming the offset in the portion in which the stylus is to be received. The lower metal mold member 25 also has a tapered groove 25*b* communicating with the tapered depression 25*a*. The upper metal mold 24 is provided at its lower surface with a projection 24*a* for cooperating with the depression 25*a*, and a tapered groove 24*b* communicating with the projection 24*a*.

The sheet 21 is disposed on the tapered depression 25*a* and the tapered groove 25*b* of the lower metal mold 25 with the center axis of the sheet aligned with the core 23. Then the upper and lower mold members 24 and 25 are clamped together and the assembly is heated by means of heating means 27 and 28. In the case where an epoxy resin is used as the binder for the carbonaceous fibers, the assembly is heated to a temperature of 170°C for 30 minutes under pressure of 10 kiolgrams per square centimeter. Subsequently, the upper and lower mold members 24 and 25 are separated from each other and the core 23 is pulled out to obtain the cantilever shown in FIG. 2. If necessary, the cantilever 11 thus obtained may be annealed for the purpose of increasing its rigidity and improving its aging characteristic.

The lengthwise orientation of the carbon fibers in the sheet 21*a* is aligned in the axial direction with the cantilever 11, and the lengthwise directions of the carbon fibers of the other sheets 21*a* and 21*c* intersect the lengthwise direction of the carbon fibers of the sheet 21*a*.

Figure 6:
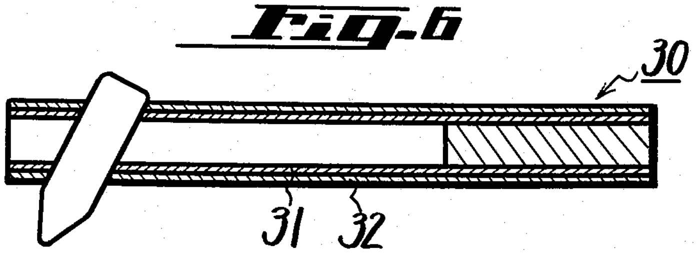
FIG. 6 is a cross sectional view of a modified cantilever assembly according to the present invention.

In FIG. 6 there is shown a modified cantilever 30 produced according to the present invention. In this embodiment, an aluminum tube 31 having a thin wall thickness is covered with a layer 32 composed of carbonaceous fibers rigidified with a thermosetting resin such as an epoxy resin or the like. The lengthwise direction of the carbon fibers of the layer 32 is not only aligned with the axial direction of the tube, but also intersects the latter. The cantilever 30 shown in FIG. 6 has the same acoustic characteristics as that of the cantilever shown in FIGS. 1 and 2.

Figure 7:
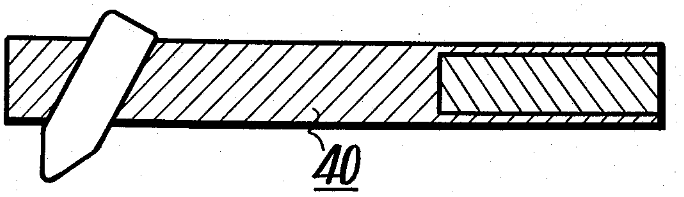
FIG. 7 is a cross sectional view of a further modified cantilever assembly.

In FIG. 7, there is shown a further modified cantilever 40 according to the present invention. The cantilever 40 is not hollow but it consists of a solid bar having a small diameter and being composed of carbon fibers rigidified with the thermosetting resin. This type of structure permits the use of a cantilever whose diameter is extremely small.

The carbon fibers may be finely divided into flakes of several millimeters thickness, and these flakes may be combined with thermosetting resins. The product thus obtained can be subjected to hot press molding or injection molding to obtain a cantilever 40 as shown in FIG. 7. It should also be understood that the carbon fibers may be woven into a fabric before being rigidified with the thermosetting resin.

The embodiments of the invention shown in the drawings are for the purpose of describing various features of the invention. It is to be understood, however, that modifications, changes and alterations may be made without departing from the scope and spirit of the invention.

We claim as our invention:

1. A cantilever for use with a phonograph pickup cartridge, said cantilever having a stylus attached to one end and a transducer attached to the other end, said cantilever comprising a body composed of carbon fibers held together with a resinous binder and having the properties of high rigidity and low mass to provide total frequency response characteristics.

2. A cantilever according to claim 1, in which the binder matrix is composed of a thermosetting resin.

3. A cantilever according to claim 1, in which said fibers are located in plies superimposed on each other, the fibers in one ply being oriented along the major axis of said body and the fibers in another ply being oriented at an angle to said major axis.

4. A cantilever according to claim 1, in which said body has a hollow end portion.

5. A cantilever according to claim 1, in which said body has a bent portion at one end inclined from the center axis of said body and arranged to receive a stylus.

6. A cantilever according to claim 5, in which said body is tapered with a reducing cross sectional area terminating at said bent portion.

7. A cantilever according to claim 1, in which said carbon fibers are in the form of a woven fabric.

8. A cantilever for use with a phonograph pick up cartridge, said cantilever having a stylus attached to one end and a transducer attached to the other end, said cantilever comprising a body composed of carbon fibers held together with a resinous binder, said held together fibers being laminated onto a metal member, said cantilever having the properties of high rigidity and low mass, due to the carbon fibers, such as to provide total frequency response characteristics.

9. A cantilever according to claim 8 in which said metal member is made of aluminum and is in the shape of a tube.

10. A cantilever according to claim 8 in which said carbon fibers are in the form of a woven fabric.

* * * * *